US012726437B2

(12) United States Patent
Gu et al.

(10) Patent No.: US 12,726,437 B2
(45) Date of Patent: Sep. 1, 2026

(54) METHOD AND APPARATUS FOR UPDATING FIRMWARE

(71) Applicant: ELECTRONICS AND TELECOMMUNICATIONS RESEARCH INSTITUTE, Daejeon (KR)

(72) Inventors: Jabeom Gu, Daejeon (KR); Hoyong Kang, Daejeon (KR); Mi-ryong Park, Daejeon (KR); Seung Sik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 303 days.

(21) Appl. No.: 18/537,998

(22) Filed: Dec. 13, 2023

(65) Prior Publication Data

US 2024/0205145 A1 Jun. 20, 2024

(30) Foreign Application Priority Data

Dec. 14, 2022 (KR) ........................ 10-2022-0175279
Nov. 6, 2023 (KR) ........................ 10-2023-0152165

(51) Int. Cl.
*H04L 45/00* (2022.01)
*H04L 67/00* (2022.01)
*H04W 84/20* (2009.01)

(52) U.S. Cl.
CPC ............ *H04L 45/563* (2013.01); *H04L 67/34* (2013.01); *H04W 84/20* (2013.01)

(58) Field of Classification Search
CPC ....... H04L 45/563; H04L 67/34; H04W 84/20
(Continued)

(56) References Cited

U.S. PATENT DOCUMENTS 8,250,223 B2 * 8/2012 Chen ................. H04M 1/72406 717/172
8,793,680 B2 * 7/2014 Jeong .................... H04W 24/02 717/173

(Continued)

FOREIGN PATENT DOCUMENTS

JP 2011-166341 A 8/2011
KR 10-2009-0128067 A 12/2009

(Continued)

OTHER PUBLICATIONS

Mbakoyiannis, Dimitris, Othon Tomoutzoglou, and George Kornaros. "Secure over-the-air firmware updating for automotive electronic control units." Proceedings of the 34th ACM/SIGAPP symposium on applied computing. 2019. pp. 174-181. (Year: 2019).*

(Continued)

*Primary Examiner* — Satish Rampuria
(74) *Attorney, Agent, or Firm* — LRK PATENT LAW FIRM

(57) ABSTRACT

A method of updating firmware of a router and a terminal node in a multi hop-based IoT wireless network system including an access point, routers, and terminal nodes, the access point, the router, and the terminal node each functioning as an OTA master in the case of a parent node, and functioning as an OTA slave in the case of a child node, the method including: determining whether the OTA master is ready to download firmware of the OTA slaves connected to the OTA master;
downloading firmware data to the OTA slave that is ready to download the firmware in units of blocks; determining firmware data blocks that need to be resent, to resend and download the firmware data blocks to the OTA slave; and when the OTA master determines that resending the firm- (Continued)

ware data blocks is completed, determining that firmware download of all the OTA slaves is completed.

19 Claims, 14 Drawing Sheets

(58) Field of Classification Search
USPC .......................................................... 717/172
See application file for complete search history.

(56) References Cited

U.S. PATENT DOCUMENTS

| | | | | |
|---|---|---|---|---|
| 11,349,557 | B2 | 5/2022 | Ghosh et al. | |
| 11,784,519 | B2 | 10/2023 | Park et al. | |
| 12,307,241 | B2 * | 5/2025 | Liu | H04L 67/34 |
| 2012/0011219 | A1 * | 1/2012 | Zhang | H04W 12/10<br>709/217 |
| 2018/0349129 | A1 | 12/2018 | Ju et al. | |
| 2020/0059538 | A1 | 2/2020 | De Smet | |
| 2020/0159521 | A1 * | 5/2020 | Marino | H04W 12/069 |
| 2022/0137948 | A1 * | 5/2022 | Chang | G06N 3/0442<br>717/173 |
| 2022/0224409 | A1 | 7/2022 | Perras et al. | |
| 2022/0342652 | A1 * | 10/2022 | Ishikawa | G06F 8/65 |
| 2022/0374226 | A1 * | 11/2022 | Liu | G06F 8/658 |

FOREIGN PATENT DOCUMENTS

| | | | |
|---|---|---|---|
| KR | 10-2013-0015243 | A | 2/2013 |
| KR | 10-1424246 | B1 | 8/2014 |
| KR | 10-1639388 | B1 | 7/2016 |
| KR | 10-2018-0068148 | A | 6/2018 |
| KR | 10-2005361 | B1 | 7/2019 |
| KR | 10-2021-0092824 | A | 7/2021 |
| KR | 10-2276409 | B1 | 7/2021 |
| KR | 10-2022-0002142 | A | 1/2022 |
| KR | 10-2022-0017645 | A | 2/2022 |
| KR | 10-2450914 | B1 | 10/2022 |
| KR | 10-2549411 | B1 | 6/2023 |

OTHER PUBLICATIONS

Feng, Tuo. Zigbee-based firmware updating algorithms in smart home environment. Diss. University of Essex, 2017. pp. 1-96. (Year: 2017).*

Wu, Zhi, et al. "Security design of OTA upgrade for intelligent connected vehicle." proceedings of the 2021 1st international conference on control and intelligent robotics. 2021. pp. 736-739. (Year: 2021).*

Tran, Minh Anh Tuan, Trong Nhan Le, and Tan Phuong Vo. "Smart-config wifi technology using ESP8266 for low-cost wireless sensor networks." 2018 International conference on advanced computing and applications (ACOMP). IEEE, 2018. pp. 1-7 (Year: 2018).*

Mavromatis, Ioannis, et al. "Reliable IOT firmware updates: A large-scale mesh network performance investigation." 2022 IEEE Wireless Communications and Networking Conference (WCNC). IEEE, 2022. pp. 108-113 (Year: 2022).*

Jutila, Mirjami. "An adaptive edge router enabling internet of things." IEEE Internet of Things Journal 3.6 (2016): pp. 1061-1069. (Year: 2016).*

Notice of Allowance of the KR Patent application No. 10-2023-0152165 dated May 6, 2026.

* cited by examiner

FIG.4

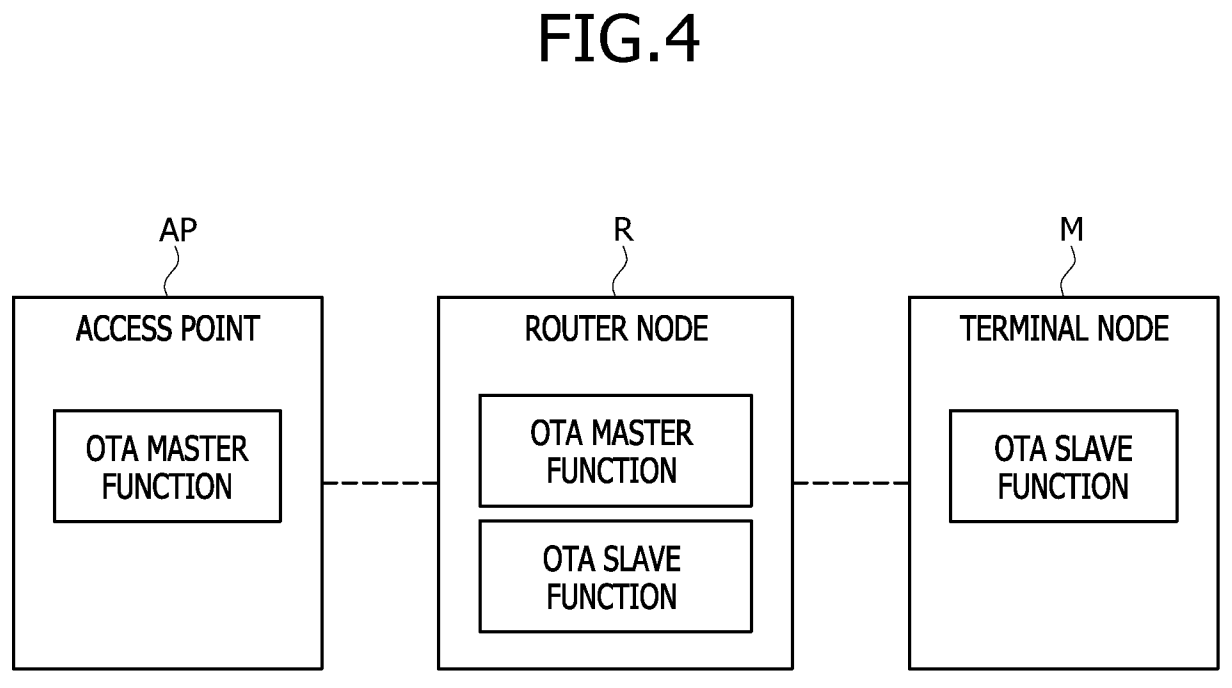

AP
ACCESS POINT
OTA MASTER FUNCTION

R
ROUTER NODE
OTA MASTER FUNCTION
OTA SLAVE FUNCTION

M
TERMINAL NODE
OTA SLAVE FUNCTION

Beacon Frame Header
Beacon Payload
OTA Payload
MAC Footer
Octets: 1/2
0/1
0/2
0/2/8
variable
variable
2/4
Frame Control
Sequence Number
Source PAN ID
Source Address
Beacon Payload Data
OTA Payload Data
FCS
Octets: 1
4
2
2
Target Device Type
Version Number
Total Size
Block Size
OTA Mode Change Info:

FIG.10

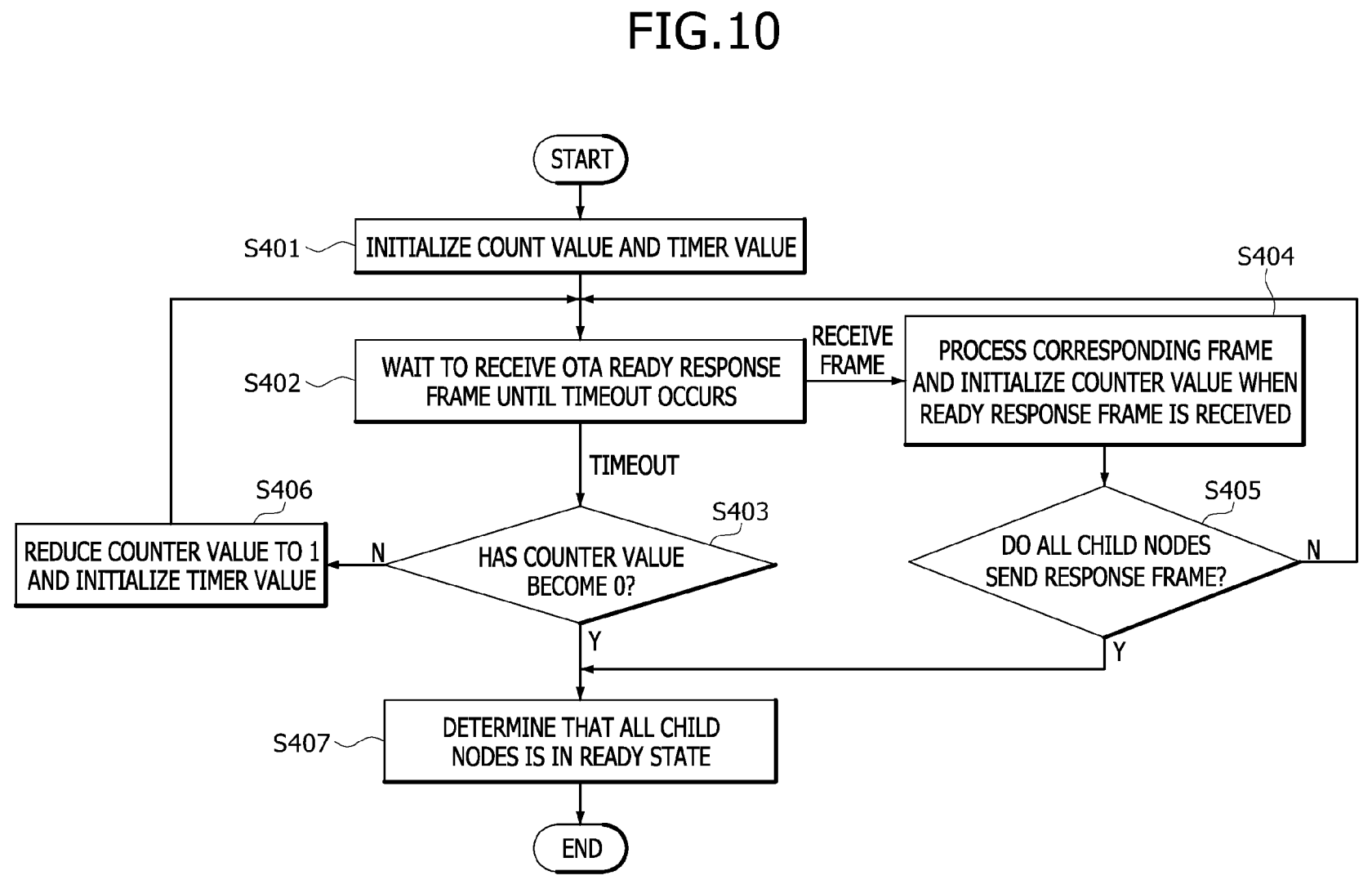

START

S401 INITIALIZE COUNT VALUE AND TIMER VALUE

S402 WAIT TO RECEIVE OTA READY RESPONSE FRAME UNTIL TIMEOUT OCCURS

RECEIVE FRAME

S404 PROCESS CORRESPONDING FRAME AND INITIALIZE COUNTER VALUE WHEN READY RESPONSE FRAME IS RECEIVED

S405 DO ALL CHILD NODES SEND RESPONSE FRAME?

N

Y

TIMEOUT

S403 HAS COUNTER VALUE BECOME 0?

Y

N

S406 REDUCE COUNTER VALUE TO 1 AND INITIALIZE TIMER VALUE

S407 DETERMINE THAT ALL CHILD NODES IS IN READY STATE

END

FIG.11

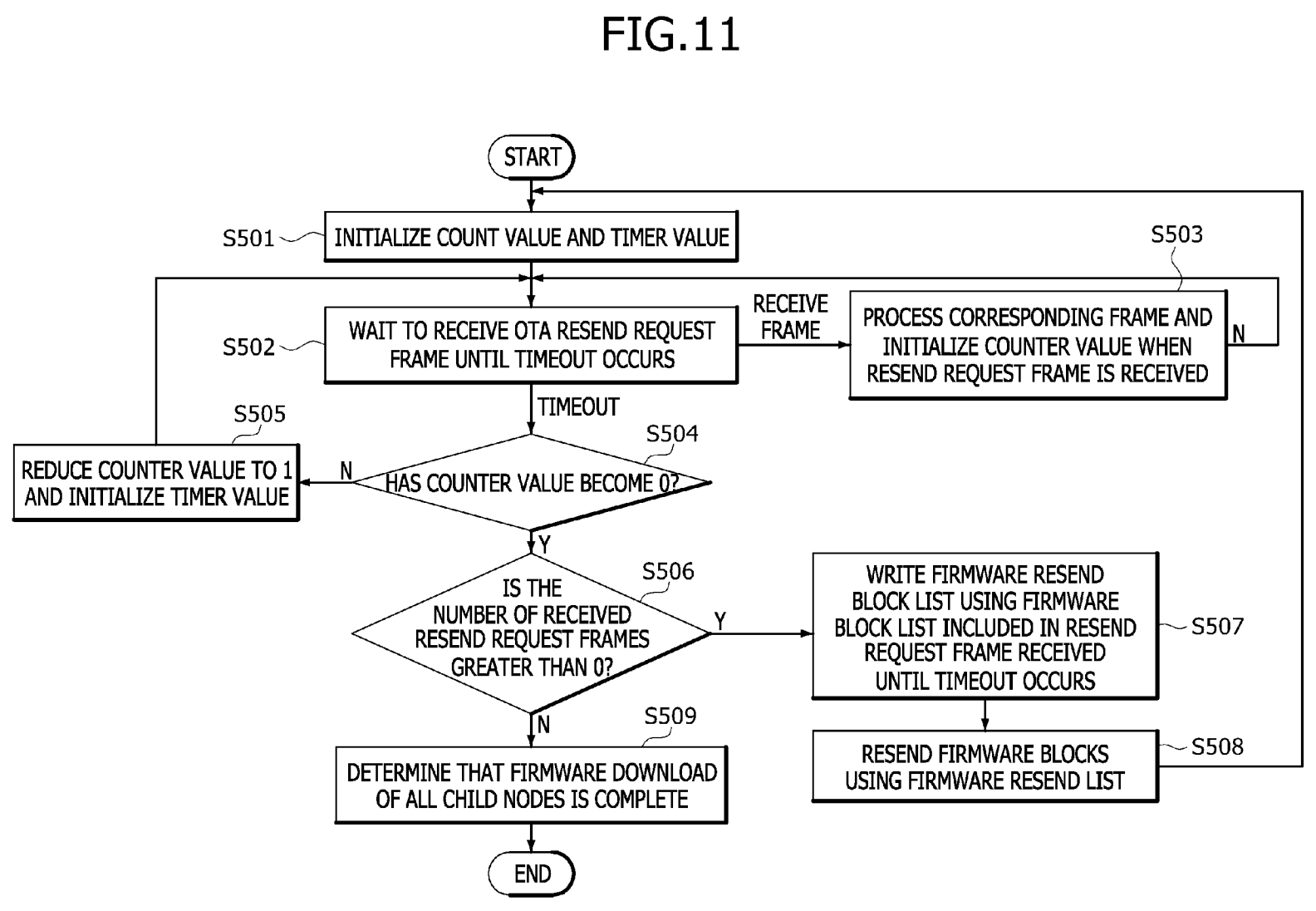

START

S501 INITIALIZE COUNT VALUE AND TIMER VALUE

S502 WAIT TO RECEIVE OTA RESEND REQUEST FRAME UNTIL TIMEOUT OCCURS

RECEIVE FRAME

S503 PROCESS CORRESPONDING FRAME AND INITIALIZE COUNTER VALUE WHEN RESEND REQUEST FRAME IS RECEIVED

N

TIMEOUT

S504 HAS COUNTER VALUE BECOME 0?

N

S505 REDUCE COUNTER VALUE TO 1 AND INITIALIZE TIMER VALUE

Y

S506 IS THE NUMBER OF RECEIVED RESEND REQUEST FRAMES GREATER THAN 0?

Y

S507 WRITE FIRMWARE RESEND BLOCK LIST USING FIRMWARE BLOCK LIST INCLUDED IN RESEND REQUEST FRAME RECEIVED UNTIL TIMEOUT OCCURS

S508 RESEND FIRMWARE BLOCKS USING FIRMWARE RESEND LIST

N

S509 DETERMINE THAT FIRMWARE DOWNLOAD OF ALL CHILD NODES IS COMPLETE

END

Beacon Frame Header
Beacon Payload
OTA Payload
MAC Footer
Octets: 1/2
0/1
0/2
0/2/8
variable
variable
2/4
Frame Control
Sequence Number
Source PAN ID
Source Address
Beacon Payload Data
OTA Payload Data
FCS
OTA Per-State Info:
Octets: 1
variable
OTA State
OTA Information

METHOD AND APPARATUS FOR UPDATING FIRMWARE

CROSS-REFERENCE TO RELATED APPLICATIONS

This application claims priority to and the benefit of Korean Patent Applications No. 10-2022-0175279, filed on Dec. 14, 2022, and No. 10-2023-0152165, filed on Nov. 6, 2023, the disclosure of which is incorporated herein by reference in its entirety.

BACKGROUND

1. Field of the Invention

The present invention relates to a method and apparatus for updating firmware that can wirelessly update the firmware in a multi hop-based Internet of things (IoT) wireless network.

2. Description of Related Art

A distributed synchronous multi-channel extension (DSME) wireless system according to the IEEE 802.15.4e standard is a network protocol designed to transmit time-sensitive sensor data in poor wireless environments.

For example, the DSME wireless system is a technology suitable for application to nuclear power plants formed of steel cement, large ships formed of steel plates, and large factories formed of steel and underground structures, and the like.

Meanwhile, in order to further expand an IoT wireless service range or minimize a radio wave shadow area, it is preferable to configure a multi hop-based wireless network using a router according to the IEEE 802.15.4e DSME MAC standard.

In this multi hop-based IoT wireless network, it is preferable to support updating a multi hop-based wireless firmware in order to facilitate maintenance of large-scale terminal nodes installed in poor environments.

The background art of the present invention is disclosed in Korean Patent No. 10-2549411 (Jun. 26, 2023).

SUMMARY OF THE INVENTION

The present invention provides a method and apparatus for updating firmware that can wirelessly update the firmware in a multi hop-based Internet of things (IoT) wireless network.

The present invention provides a method and apparatus for updating firmware that can switch a mode of a wireless node (e.g., router, terminal node) from a normal mode for collecting sensor data to an over the air (OTA) mode for wireless firmware update in a multi hop-based IoT wireless network, wirelessly download new firmware in the OTA mode, and apply the downloaded new firmware to the wireless node.

According to an aspect of the present invention, there is provided a method of updating firmware of a router and a terminal node in a multi hop-based Internet of things (IoT) wireless network system including an access point, a plurality of routers, and a plurality of terminal nodes, the access point, the router, and the terminal node each functioning as an over the air (OTA) master in the case of a parent node, and functioning as an OTA slave in the case of a child node, the method including: a ready operation of determining whether the OTA master, which is the parent node, is ready to download firmware of all the OTA slaves, which are the child nodes wirelessly connected to the OTA master; an operation of downloading, by the OTA master, firmware data to the OTA slave that is ready to download the firmware in units of blocks; a resend operation of determining, by the OTA master, firmware data blocks that need to be resent, to resend and download the firmware data blocks to the OTA slave; and when the OTA master determines that resending all the firmware data blocks is completed, a completion operation of determining that firmware download of all the OTA slaves is completed.

In the ready operation, the OTA master may send an OTA ready beacon frame to the child node, the OTA slave that receives the OTA ready beacon frame may send an OTA ready response to the OTA master to notify a ready state, and the OTA master that receives the OTA ready response may determine that all the child nodes connected to the OTA master are ready to download the firmware.

In the operation of the downloading, the OTA master may send an OTA download beacon frame to the OTA slave and download the firmware data to the OTA slave in units of blocks using a plurality of GTS slots within a corresponding beacon interval.

In the operation of the downloading, the OTA master may repeat the download to the OTA slave until the OTA master sends a last firmware data block, and the OTA slave may perform validation of the downloaded firmware data block.

In the resend operation, after completing the firmware download, the OTA master may send an OTA resend beacon frame to the OTA slave, the OTA slave that receives the OTA resend beacon may send an OTA resend request to the OTA master for the firmware data block that needs to be resent, and the OTA master may receive the OTA resend request to determine which block needs to be resent.

In the completion operation, when the OTA master determines that the firmware download of all the OTA slaves is completed, the OTA master may send an OTA complete beacon frame to the OTA slaves to perform the firmware download procedure.

When one or more routers are included in the child nodes, the OTA master may perform firmware download on the routers corresponding to the child OTA nodes connected to the OTA master in a way that the OTA master selects a lower router one by one and sends the selected lower router including an address value of a corresponding lower router to an OTA complete beacon frame.

When the firmware download to the routers corresponding to the child OTA nodes is completed, the router corresponding to the child OTA node may send an OTA complete beacon frame to the OTA master that is a parent of the router, and the OTA master that is the parent may receive the OTA complete beacon frame and validate that the firmware download by the router corresponding to the child OTA node of the OTA master is completed.

When the OTA master no longer has a router corresponding to the child OTA node that downloads the firmware, a preset value may be set in an address value of the OTA complete beacon to notify that there are no more routers to perform the download.

The access point may include a personal area network coordinator (PNC) function that is a lower wireless node management function, and support generation and management of a network and interworking of a wired area and a wireless network service area, the router relays sensor data sent from the terminal node so that the sensor data may be collected by the PNC, and may relay and send a beacon frame sent from the PNC, and the terminal node may be a node that collects the sensor data, and may send the sensor data to the access point via the router.

Before updating the firmware starts, the access point may send a beacon frame indicating a normal mode to the router, and the router may relay the beacon frame and send the beacon frame to other routers and terminal nodes that constitute the wireless network, and in the normal mode, the sensor data collected by one or more terminal nodes may be sent to the access point via the router.

When the access point sends the beacon frame, the access point may send the beacon frame for every designated beacon interval, and the router may allocate some of superframes and send data using carrier sense multiple access-collision avoidance (CSMA-CA) during the contention access period (CAP) send period for communication with other wireless nodes so that the router relays and sends the beacon frame, and allocate a guaranteed time slot (GTS) to each wireless node within a contention free period (CFP) send period to secure reliability of sending of time-sensitive sensor data while maintaining a superframe structure of IEEE 802.15.4.

After the completion operation, when it is determined that firmware download of all the child nodes is completed, the access point corresponding to the OTA master may notify the child node to apply new firmware, and the router may be implemented to apply the new firmware by relaying corresponding contents to a lower wireless node and notifying the lower wireless node.

When updating the firmware starts, the access point may send a beacon frame notifying that the mode is switched from a normal mode to an OTA mode to the router and a lower wireless node, and a wireless node that receives a beacon frame notifying that the mode changes to the OTA mode may switch to the OTA mode and wait in a stand-by state.

The beacon frame may be a beacon frame to which a beacon payload for updating the firmware is added, and the beacon payload may include OTA mode change information, and the OTA mode change information may include at least one of target device type, version number, total size, and block size information.

The target device type may be a wireless node type to which the corresponding OTA is applied, and the PNC, the router, or the terminal node may be set, build date and time information or a value corresponding to a version of new firmware to be updated may be set in the version number, a total size of the new firmware may be set in the total size, and a size of a block that the access point or the router sends at one time may be set in the block size.

The beacon frame may be a beacon frame to which an OTA payload is added for updating the firmware, and the OTA payload may be OTA per-state information and include an OTA state field and an OTA information field.

The OTA state field may be a field indicating any one of an OTA ready beacon, an OTA download beacon, an OTA resend beacon, and an OTA complete beacon or OTA finish beacon, and the OTA information field may be a field for recording additional information corresponding to an OTA state value.

When the OTA master downloads the firmware using consecutive GTS slots, the OTA master may allocate one or more GTS slots within one superframe, and reallocate all the GTS slots in the superframe to be used to send the firmware data blocks to reduce a time required to download the firmware.

According to another aspect of the present invention, there is provided an apparatus for updating firmware of a router and a terminal node in a multi hop-based Internet of things (IoT) wireless network system including an access point, a plurality of routers, and a plurality of terminal nodes, in which the access point, the router, and the terminal node may each function as an over the air (OTA) master in the case of a parent node, and function as an OTA slave in the case of a child node, the OTA master, which is a parent node, may determine whether firmware download of all OTA slaves, which are child nodes wirelessly connected to the OTA master, is ready to download, the OTA master may download firmware data to the OTA slave, which is ready to download the firmware in units of blocks, the OTA master may determine which firmware data block needs to be resent to resend and download the firmware data block to the OTA slave, and when it is determined that resending all the firmware data blocks is completed, the OTA master may determine that the firmware download of all the OTA slaves is completed.

BRIEF DESCRIPTION OF THE DRAWINGS

FIG. 4 is an exemplary diagram for describing an over the air (OTA) master or an OTA slave function installed for each access point, router, and terminal node of a wireless node in FIG. 1.

FIG. 10 is an exemplary diagram for describing the process of determining, by the OTA master, whether all child nodes connected to the OTA master are ready to download firmware in FIG. 6.

FIG. 11 is an exemplary diagram for describing a process of resending, by the OTA master, a firmware block or determining that firmware download is completed in FIG. 6.

DETAILED DESCRIPTION OF EXEMPLARY EMBODIMENTS

Figure 1:
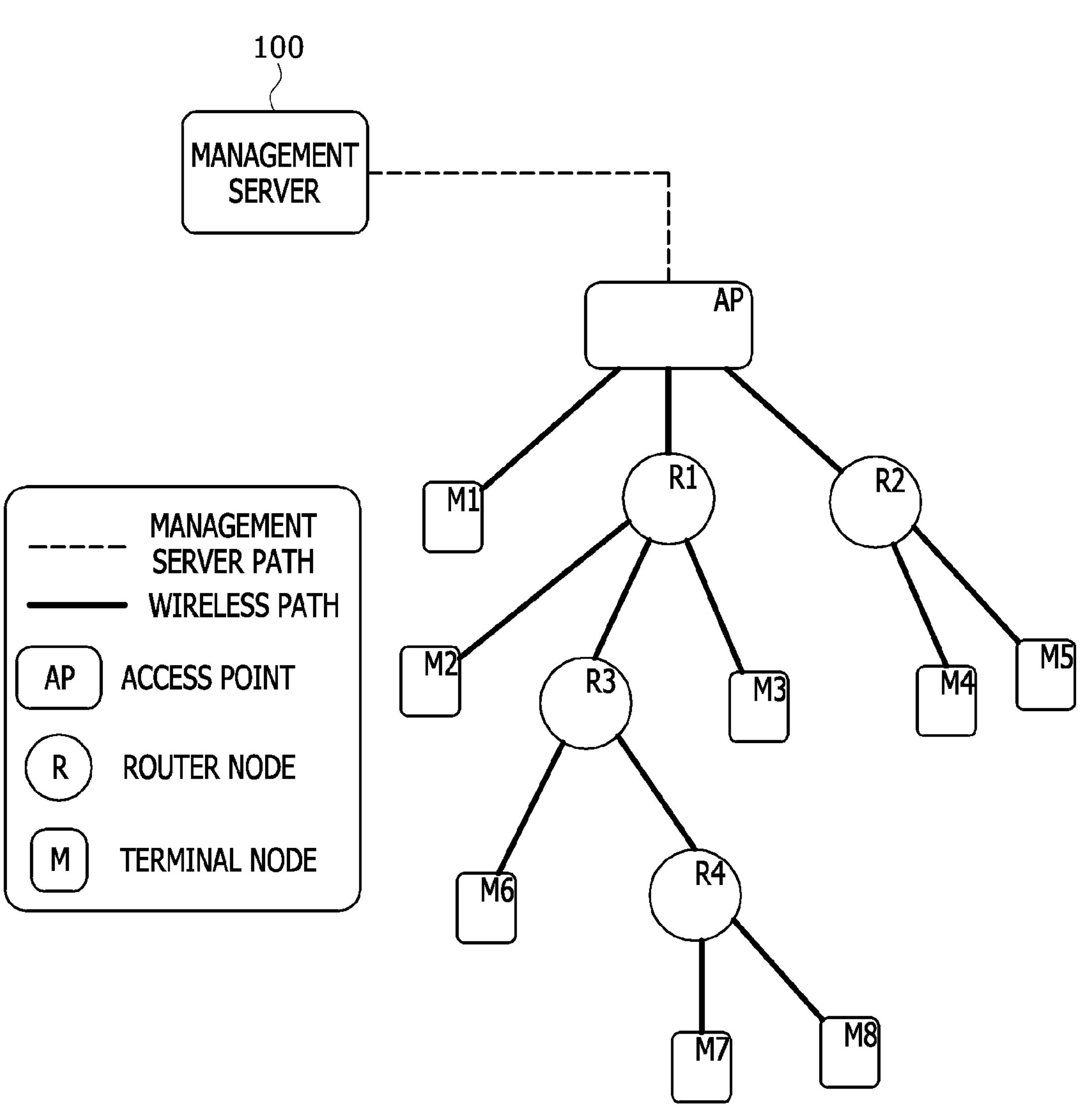
FIG. 1 is an exemplary diagram illustrating a multi hop-based Internet of Things (IoT) wireless network including a management server (100), an access point AP, a router R, and a terminal node M by the IEEE 802.15.4e distributed synchronous multi-channel extension (DSME) wireless system.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

In the present invention according to an embodiment, a wireless firmware update means, for example, providing and applying new firmware specified by a management server 100 to each wireless node (e.g., router, terminal node) through a multi hop-based Internet of things (IoT) wireless network.

Since the wireless firmware update sometimes includes an update to wireless characteristics such as a bandwidth used for communication, when any one node among an access point AP, a router R, or a terminal node M is missing an update in the multi-hop-based IoT wireless network that supports the wireless firmware update, communication or service errors may occur due to different firmware versions. Therefore, in the present invention, the wireless firmware update may be applied simultaneously to all nodes constituting the network.

In addition, in the present invention according to an embodiment, a length of data that one wireless node may send at one time in the multi hop-based IoT wireless network is usually determined by a wireless bandwidth allocated to a wireless node and a guaranteed time slot (GTS) slot length corresponding to a send time. Therefore, when a length of firmware that needs to be updated exceeds the data length that may be sent at one time, the firmware may be divided into multiple blocks and sent.

In addition, in the present invention according to an embodiment, when performing the wireless firmware update in the multi-hop-based IoT wireless network and when the number of firmware blocks that need to be sent is large, by reallocating the GTS send slot within the entire superframe to send the firmware, it is possible to reduce the time required to send the entire firmware.

In addition, in the present invention according to an embodiment, contents regarding various settings required to wirelessly update the firmware in the multi hop-based IoT wireless network may be included in a beacon and may be received by each wireless node.

In addition, the present invention according to an embodiment relates to an apparatus and method of updating firmware that can switch a mode of a wireless node (e.g., router and terminal node) from a normal mode for collecting sensor data to an over the air (OTA) mode for wireless firmware update in the multi hop-based IoT wireless network, wirelessly download new firmware in the OTA mode, and apply the downloaded new firmware to the wireless node.

FIG. 1 is an exemplary diagram illustrating a multi hop-based IoT wireless network including a management server 100, an access point AP, a router R, and a terminal node M by the IEEE 802.15.4e distributed synchronous multi-channel extension (DSME) wireless system.

As illustrated in FIG. 1, the multi hop-based IoT wireless network is composed of the management server 100 and a wireless network system, and the wireless network system includes one access point AP, and one or more routers R and terminal nodes M that support the IEEE 802.15.4e DSME-based multi hop IoT wireless network.

The management server 100 performs a function of controlling information on lower wireless nodes (access point, router, terminal node), managing multi-hop network configuration information, or collecting sensor data.

The access point AP includes a personal area network (PAN) coordinator (personal area network coordinator (PNC)), which is a lower wireless node (e.g., router, terminal node) management function, generates and manages the network, and supports interworking of the existing wired area and a wireless network service area.

Here, the PNC sends a periodic beacon frame to provide information related to a network configuration to the router R and the terminal node M that want to access the network, and receives and processes an association request of the terminal node. In this case, the information related to the network configuration may include a network superframe structure, a time slot allocation state, and time information.

The router R relays the sensor data sent from the terminal node M so that the sensor data may be collected by the PNC.

In addition, the router R relays and sends the beacon frame sent from the PNC. For reference, in the case of the multi hop-based IoT wireless network, one or more routers R may be used to relay such data.

In addition, the router R may be configured in a full function device (FFD) format according to the IEEE 802.15.4e standard, for example.

The terminal node M is a node that collects the sensor data.

The data collected by the terminal node M is sent to the management server 100 via the router R or the access point AP.

The terminal node M can be configured, for example, in a reduced-function device (RFD) format according to the IEEE 802.15.4e standard.

Referring to FIG. 1, the multi hop-based IoT wireless network according to the embodiment includes the management server 100, the access point AP, four routers R1 to R4, and eight terminal nodes M1 to M8, and three wireless nodes M1, R1, and R2 are connected to the access point AP, the second and third terminal nodes M2 and M3 and the third router R3 are connected to the first router R1, the fourth and fifth terminal nodes M4 and M5 are connected to the second router R2, the sixth terminal node M6 and the fourth router R4 are connected to the third router R3, and the seventh and eighth terminal nodes M7 and M8 are connected to the fourth router R4.

For the description of the present invention, it is assumed that in the multi hop-based IoT wireless network, a relationship between a parent node and a child node is established between one node and a lower node connected to the node.

For example, for the three wireless nodes M1, R1, and R2 connected to the access point AP, the access point AP corresponds to the parent node, and the three wireless nodes M1, R1, and R2 correspond to the child nodes. Likewise, the first router R1 corresponds to parent nodes of the wireless nodes M2, R3, and M3, and the wireless nodes M2, R3, and M3 correspond to child nodes of the first router R1.

In this case, in the embodiment, for convenience of description, an IoT wireless network in which the management server 100 exists separately is illustrated, but the management server 100 is not necessarily required or is not intended to limit the spirit of the invention. For example, even when the management server 100 and the access point AP exist as one entity, it is possible to apply the wireless update firmware method in the multi hop-based IoT wireless network according to the present invention.

Meanwhile, as illustrated in FIG. 1, when the management server 100 exists separately, it is assumed that a network path exists between the management server 100 and the access point AP.

Figure 2:
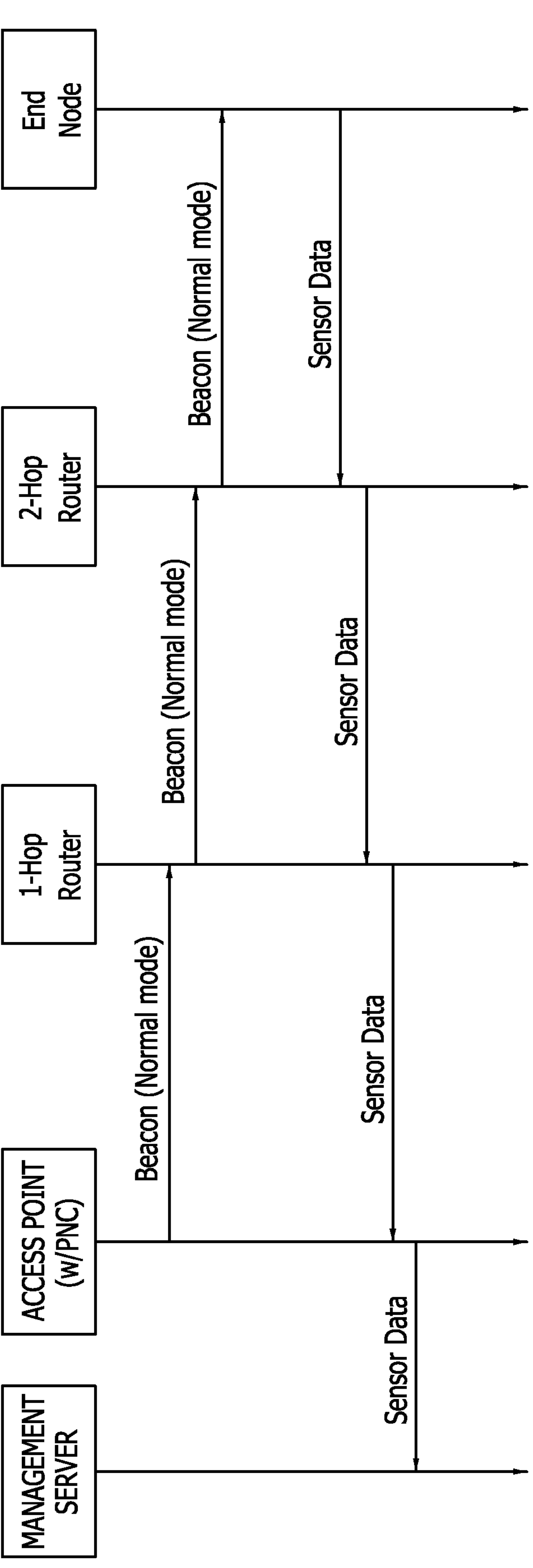
FIG. 2 is an exemplary diagram illustrating operations performed in each wireless node before starting to wirelessly update firmware in the multi hop-based IoT wireless network in FIG. 1.

FIG. 2 is an exemplary diagram illustrating operations performed in each wireless node before starting to wirelessly update the firmware in the multi hop-based IoT wireless network in FIG. 1. Before the wireless firmware update starts in the multi-hop-based IoT wireless network, the access point AP sends a beacon frame indicating that the access point AP is in a normal mode to the router (R: 1-hop router), and the router (R: 1-hop router) relays the beacon frame and notifies other routers (R: 2-hop router) and terminal nodes (M: end node), which constitute the wireless network, of the beacon frame.

In addition, in the normal mode, the sensor data collected by one or more terminal nodes (M: end node) is sent to the management server 100 via the routers (R: 1-hop router, 2-hop router) and the access point AP.

Figure 3:
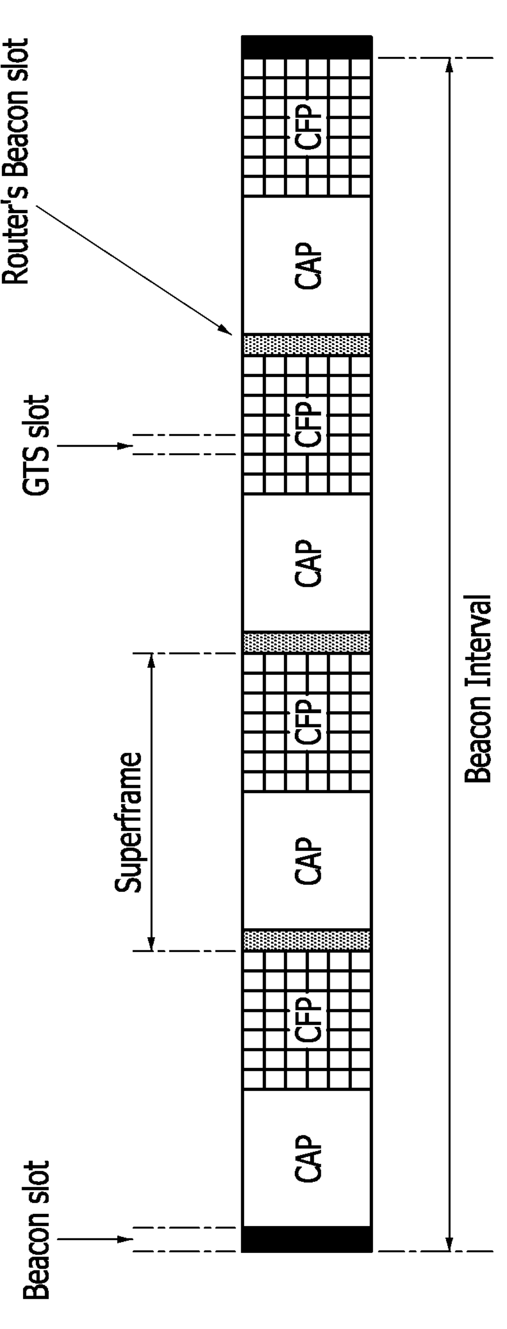
FIG. 3 is an exemplary diagram illustrating a structure of a typical superframe in a DSME send method according to the IEEE 802.15.4e.

FIG. 3 is an exemplary diagram illustrating a structure of a typical superframe in a DSME send method according to the IEEE 802.15.4e.

Referring to FIG. 3, in the DSME send method according to the IEEE 802.15.4e, the access point AP sends the beacon frame for every beacon interval.

The access point AP can allocate some of the superframes so that the router R relays and sends the beacon frame.

The wireless nodes (e.g., access point, router, terminal node) according to the IEEE 802.15.4e standard sends data using carrier sense multiple access-collision avoidance (CSMA-CA) during a contention send period called a contention access period (CAP) for communication with other wireless nodes.

The DSME according to the IEEE 802.15.4e standard defines a contention free period (CFP) to secure reliability of sending of time-sensitive sensor data while maintaining the superframe structure of the existing IEEE 802.15.4, and uses a method of guaranteeing a send opportunity by allocating the GTS to each wireless node within the send period.

FIG. 4 is an exemplary diagram for describing an OTA master or an OTA slave function installed for each access point, router, and terminal node of a wireless node in FIG. 1.

In order to wirelessly update the firmware in the multi-hop-based IoT wireless network according to the present invention, each wireless node (e.g., access point, router, terminal node) is additionally equipped with an OTA master function or an OTA slave function.

As described above, in the multi hop-based IoT wireless network, it is described that the relationship between the parent node and the child node is established between one node and the lower node connected to the one node. The OTA master function is mounted on the parent node, and the OTA slave function is mounted on the child node.

Accordingly, the access point AP is equipped with the OTA master function, the router R is equipped with the OTA master function and the OTA slave function, and the terminal node M is equipped with the OTA slave function.

In order to wirelessly update the firmware in the multi hop-based IoT wireless network according to the embodiment, the OTA master function mounted on the access point AP is a function used to send firmware to child nodes connected to the access point AP, the OTA slave function mounted on the router R is a function used to download the firmware from the parent node to which the router R is connected, the OTA master function mounted on the router R is a function used to send the firmware to the child nodes connected to the router R, and the OTA slave function mounted on the terminal node M is a function used to download the firmware from the parent node to which terminal node M is connected.

Hereinafter, in the embodiment, the OTA master refers to a wireless node including the OTA master function, and the OTA slave refers to a wireless node including the OTA slave function.

Figure 5A:
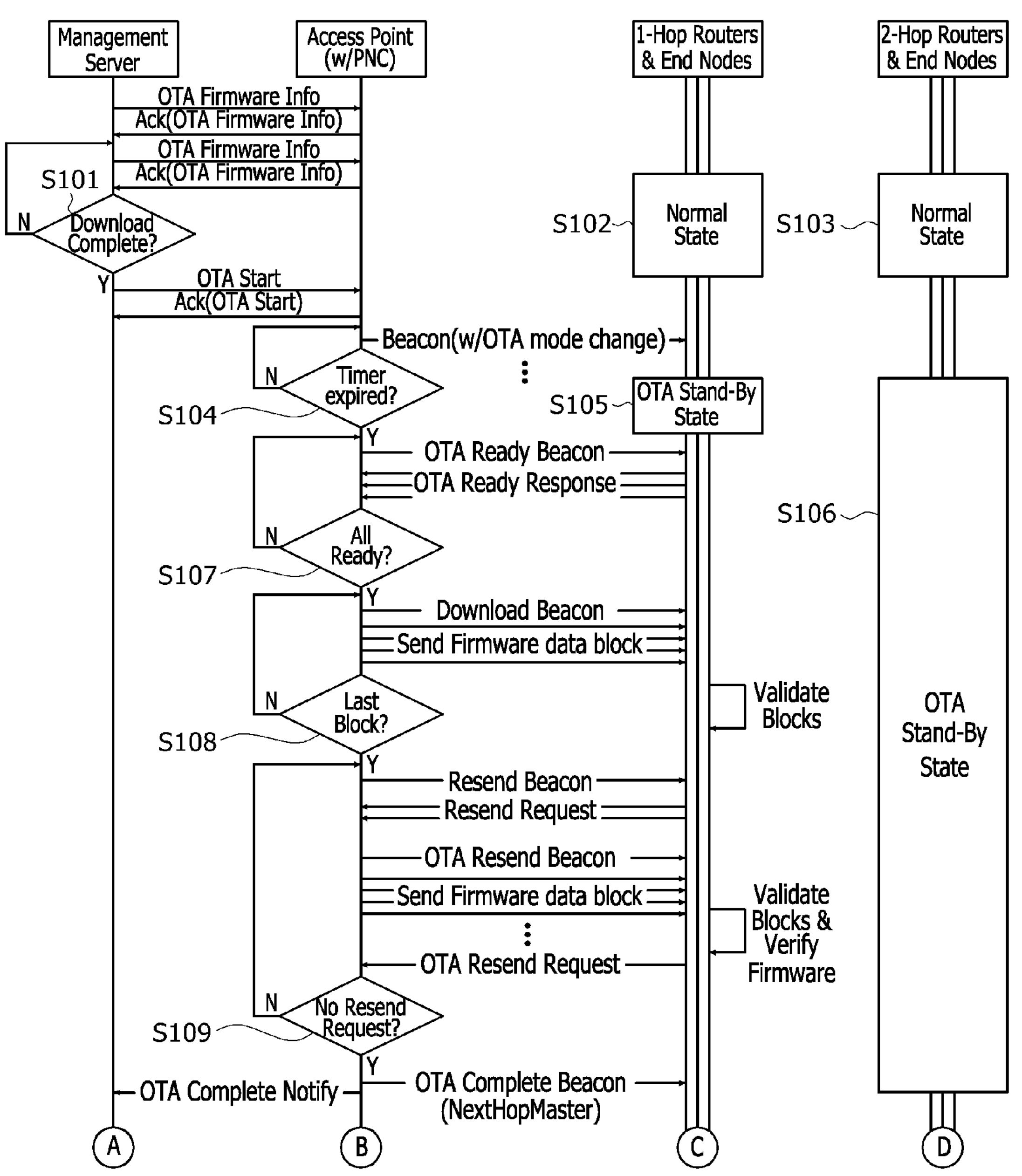
FIGS. 5A and 5B are flowcharts illustrating an entire process of performing wireless firmware update in the multi hop-based IoT wireless network according to an embodiment of the present invention.
Figure 5B:
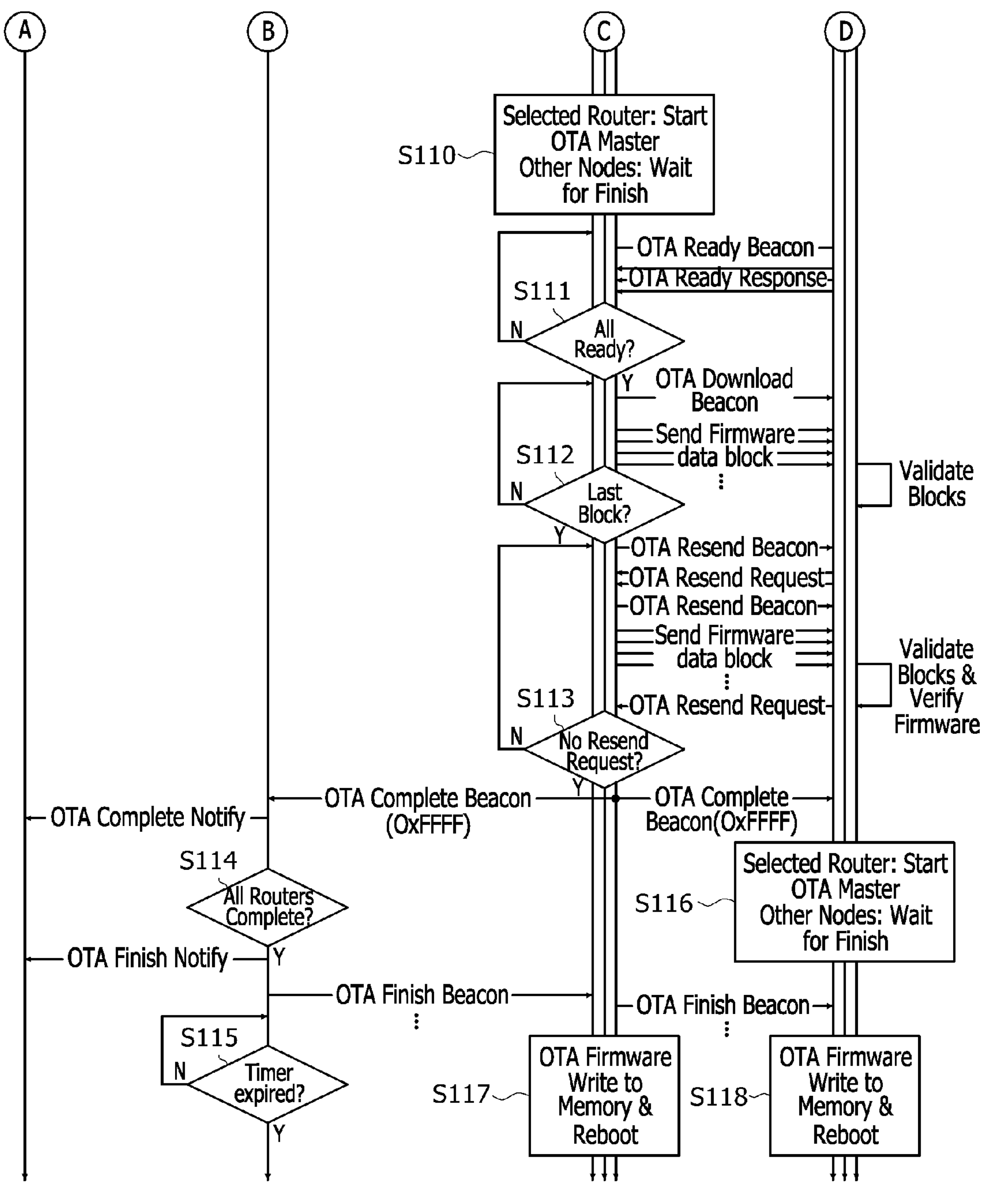

FIGS. 5A and 5B are flowcharts illustrating an entire process of performing the wireless firmware update in the multi hop-based IoT wireless network according to an embodiment of the present invention.

Referring to FIGS. 5A and 5B, the management server sends OTA firmware information and OTA firmware data to the access point to start wirelessly updating firmware in the multi hop-based IoT wireless network according to the present invention. Accordingly, the access point sends an acknowledge (Ack) signal to each of the OTA firmware information and the OTA firmware data.

The management server determines whether the sending of the OTA firmware data succeeds based on the Ack signal (S101), and then, when it is determined that the sending of the OTA firmware data succeeds (Y in S101), sends an OTA start command to the access point. The access point that receives the OTA start command sends the Ack signal thereto.

The access point that receives the OTA start command sends a beacon frame indicating that it has changed to an OTA mode (e.g., OTA master, OTA slave) within a specified time to start a firmware download process for all wireless nodes (S104), and the beacon frame is relayed to the lower wireless node by the router.

The wireless node that receives the beacon frame switches to the OTA mode and waits in a stand-by state (S102→S105, S103→S106).

The procedure is performed for a predetermined period of time (i.e., until a timer expires) so that all the wireless nodes may receive a beacon or a relay beacon frame.

For reference, the sending of the beacon frame notifying that the mode changes to the OTA mode will be described in more detail with reference to FIGS. 7 and 8.

The access point AP sends an OTA ready beacon frame to the lower wireless node to validate whether the lower wireless nodes connected to the access point AP, that is, the routers (R: 1-hop routers) and the terminal nodes (M: end nodes) are ready to download the firmware (S107). Accordingly, the wireless nodes (e.g., 1-hop routers & end nodes) that receive the OTA ready beacon frame send an OTA ready response frame to the access point to notify that the wireless nodes are ready to download the firmware.

When all child nodes are ready to download the firmware (Y in S107), the firmware download procedure by the access point starts.

In this case, although not illustrated in detail in the drawing, the procedure (i.e., firmware download procedure) includes a procedure of downloading, by the OTA master of the access point, firmware blocks, validating firmware download blocks in all the child nodes, requesting a resend for a missing block, repeating until there are no more resend request, and verifying the firmware downloaded from all the child nodes (S108 and S109).

The procedure (i.e., firmware download procedure) will be described in more detail with reference to FIGS. 9 to 11.

When there are no more firmware block resend request (Y in S109), the access point sends an OTA complete beacon frame to the lower wireless node to indicate completion (S110).

In this case, when the router is included in the child nodes, a value (NextHopMaster value) corresponding to an address value of one of the routers is included in the OTA complete beacon frame and sent.

For reference, the purpose of the OTA master sending the OTA complete beacon frame including the value (NextHop-Master value) corresponding to the address value of one of the routers to the lower wireless node is, for the child node that receives the OTA complete beacon frame, 1) to allow a router corresponding to the address value to start the firmware download procedure, 2) to allow a router not corresponding to the address value to stay in a waiting state until the router receives the OTA complete beacon frame corresponding to its own address value, and 3) to allow terminal nodes to wait until the terminal nodes receive an OTA finish beacon frame, and the additional purpose is to, for the parent node that receives the OTA complete beacon frame, notify that the firmware download by the router is performed.

Meanwhile, operations S111 to S113 represent a procedure of downloading, by a router, firmware, and when comparing operations S111 to S113 with operations S107 to S109, only a positional relationship between the OTA master and OTA slave functions has changed, but the same procedure is repeated.

The firmware download procedure by the router is sequentially performed to update the firmware of all the wireless nodes in the multi-hop-based IoT wireless network.

For the access point or router to send the OTA complete beacon frame, the access point may use, as the value (NextHopMaster value) corresponding to the address value of one of the routers of the OTA complete beacon, a preset value such as 0xFFFF to notify that there are no more routers performing the download among the child nodes (Y in S113). In addition, for the access point to send the OTA complete beacon frame, when the access point changes the value (NextHopMaster value) corresponding to the address value of one of the routers, or receives the OTA complete beacon frame sent by the child router, the access point may additionally send an OTA complete notify frame to the management server to notify the management server of the situation.

Meanwhile, the access point determines that the firmware download of all of its own child nodes is completed, and the firmware download procedure for all the wireless nodes in the network is completed by receiving the OTA complete beacon frame including the preset value such as 0xFFFF from all of its own child routers (Y in S114).

In this case, the access point starts a firmware update application process so that all the wireless nodes may apply new firmware. To apply the firmware update, the OTA master sends the OTA finish beacon frame for a certain period of time (i.e., before a timer expire) (S115).

In this case, the router relays the OTA finish beacon frame to the lower wireless node, and the access point may use the OTA finish notify frame to notify the management server that the firmware update application procedure is performed.

Figure 6:
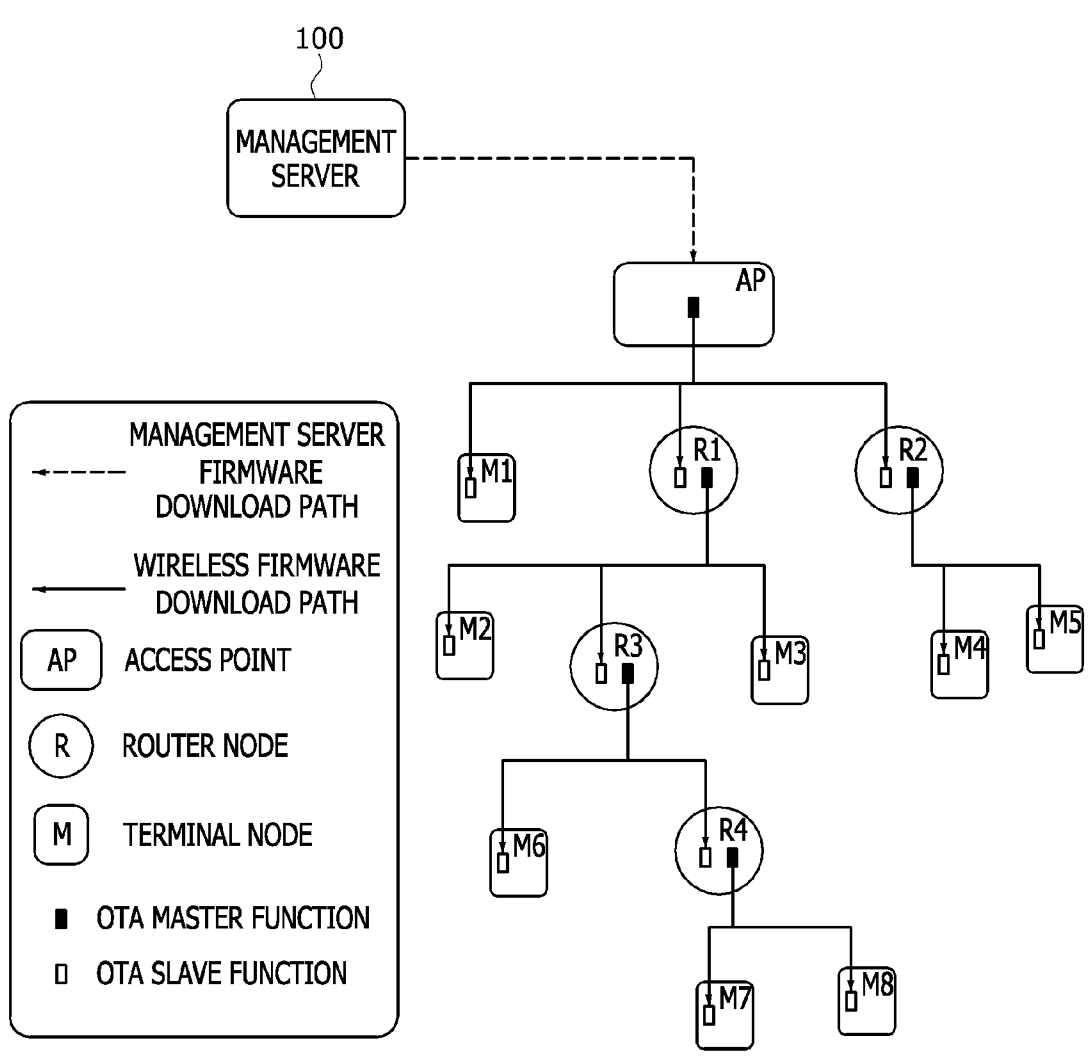
FIG. 6 is an exemplary diagram for describing a resend relationship of the OTA master and the OTA slave between wireless nodes in the multi-hop-based IoT wireless network in FIG. 1.

FIG. 6 is an exemplary diagram for describing a resend relationship of the OTA master and the OTA slave between the wireless nodes in the multi-hop-based IoT wireless network in FIG. 1.

Referring to FIG. 6, the management server 100 downloads the firmware to the access point AP using a path along which the firmware is downloaded from the management server 100 to the access point. The path can use, for example, a TCP/IP-based network. The access point downloads the firmware from the management server 100 and starts the OTA master function.

Referring to FIG. 6, the access point AP switches the operation mode of all the wireless nodes to the OTA mode to start updating the firmware in the multi hop-based IoT wireless network.

The OTA master of the access point AP validates a ready state of the OTA slaves of the first router R1, the first terminal node M1, and the second router R2 and downloads the firmware. When it is determined that the firmware download of all the child nodes is completed, the OTA master of the access point AP selects the first router R1 to initiate the firmware download procedure by the router.

In addition, the OTA master of the first router R1 validates the ready state of the third router R3, the second terminal node M2, and the third terminal node M3 and downloads the firmware. When the firmware download of all the child nodes is completed, the OTA master of the first router R1 selects the third router R3 to initiate the firmware download procedure by the router.

In addition, the OTA master of the third router R3 validates the ready state of the OTA slaves of the fourth router R4 and the sixth terminal node M6 and downloads the firmware. When the firmware download of all the child nodes is completed, the OTA master of the third router R3 selects the fourth router R4 to initiate the firmware download procedure by the router.

The OTA master of the fourth router R4 validates the ready state of the OTA slaves of the seventh terminal node M7 and the eighth terminal node M8 and downloads the firmware. When the firmware download of all the child nodes is completed, the OTA master of the fourth router R4 notifies the parent node that the firmware download is completed.

The third router R3 that receives this notification determines that the firmware download of all the child nodes is completed, and notifies the parent node that the OTA master of the third router R3 has completed the firmware download.

The first router R1 that receives this notification determines that the firmware download of all the child nodes is completed, and notifies the parent node that the OTA master of the first router R1 has completed the firmware download.

The OTA master of the access point that receives this notification selects the second router R2 to initiate the firmware download procedure by the router.

The OTA master of the second router R2 downloads the firmware to the OTA slaves of the fourth terminal node M4 and the fifth terminal node M5, and when the firmware download of all the child nodes is completed, the OTA master of the second router R2 notifies the parent node that the firmware download is completed.

When the OTA master of the access point AP that receives this notification determines that the firmware download for all the child nodes is completed, the OTA master of the access point AP notifies the child nodes to apply new firmware. The router that receives this notification relays the contents to the lower wireless nodes and informs the contents, and all the wireless nodes in the multi-hop-based IoT wireless network that receives this notification apply the new firmware. The OTA master of the access point AP sends the new firmware application result to the management server 100.

Figure 7:
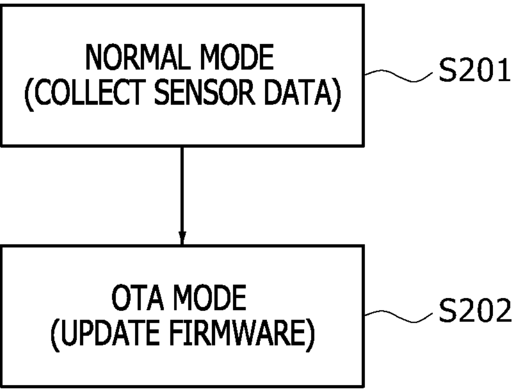
FIG. 7 is an exemplary diagram for describing an operation of switching an operation mode of a wireless node to an OTA mode to start updating the firmware in the multi hop-based IoT wireless network in FIG. 6.

FIG. 7 is an exemplary diagram for describing an operation of switching an operation mode of a wireless node to an OTA mode to start updating the firmware in the multi hop-based IoT wireless network in FIG. 6.

Referring to FIG. 7, in order to start updating the firmware in the multi hop-based IoT wireless network, the access point may switch the operation mode of all the wireless nodes from the normal mode (i.e., sensor data collection mode) to the OTA mode (i.e., firmware update mode through the OTA), and in the present invention, in order to switch to the OTA mode, the access point may send a newly defined data frame to all the wireless nodes or use the beacon frame.

For example, the characteristics that the beacon frame sent by the access point AP is relayed and sent by the router R may be used. For this purpose, in order to wirelessly update the firmware, the beacon payload of the beacon frame that the access point AP sends or that the router R relays and sends may include and send a data value that may distinguish between the normal mode and the OTA mode.

The wireless node of the multi-hop-based IoT wireless network that collects the sensor data in the normal mode receives the data frame or beacon frame including the OTA mode change information sent by the access point AP, or the beacon frame sent by the router, and when its mode is not the OTA mode, the mode switches to the OTA mode.

Figure 8:
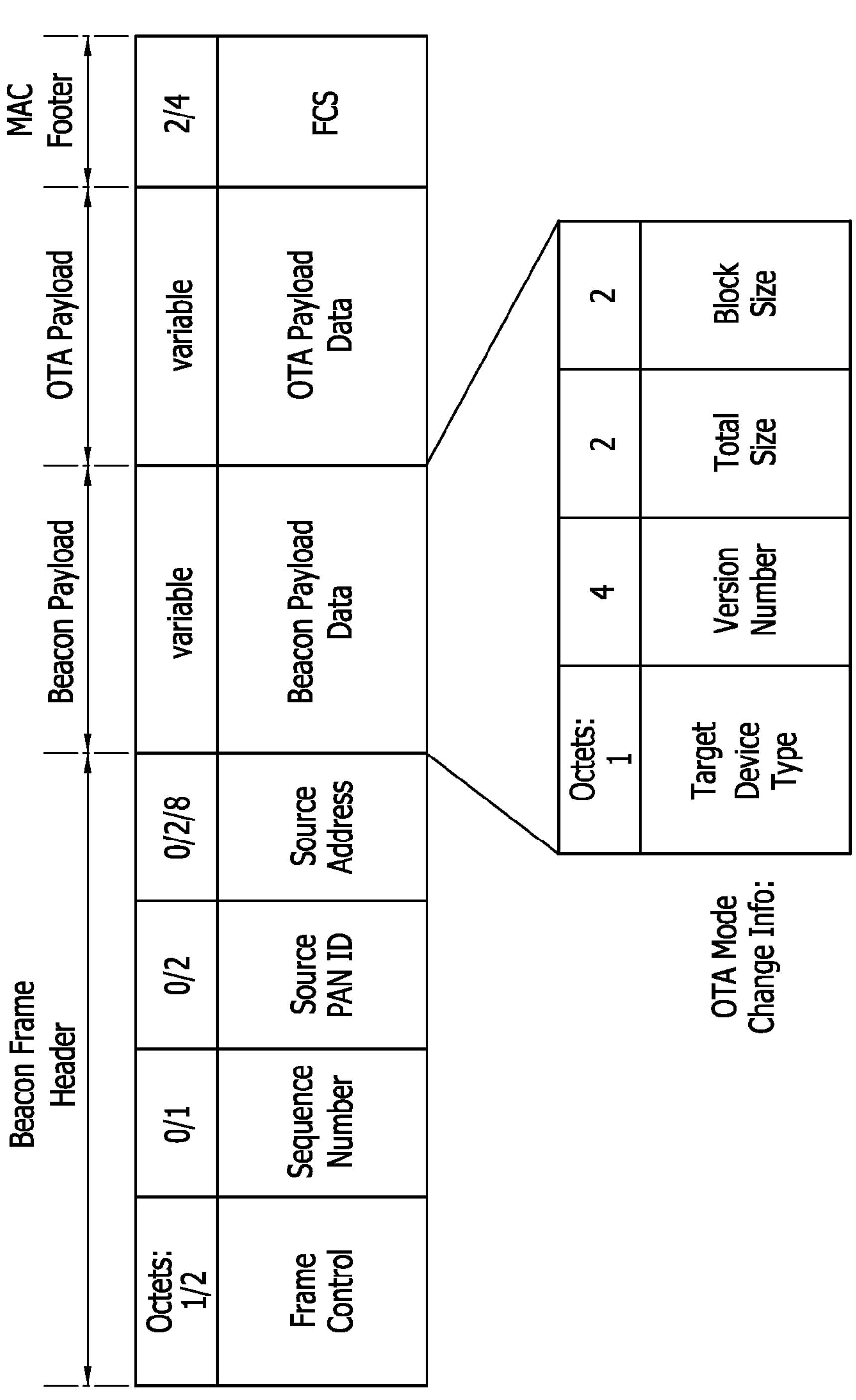
FIG. 8 is an exemplary diagram illustrating a beacon frame to which a beacon payload is added in order to wirelessly update firmware in the multi hop-based IoT wireless network in FIG. 6.

FIG. 8 is an exemplary diagram illustrating a beacon frame to which a beacon payload is added in order to wirelessly update firmware in the multi hop-based IoT wireless network in FIG. 6.

The beacon payload is originally used to include information such as wireless node management and resource allocation by the PNC. In the present invention, in order to use this, the beacon payload may further include the OTA mode change information.

For example, as illustrated in FIG. 8, the OTA mode change information included in the beacon payload includes information such as a target device type, a version number, a total size, and a block size.

The target device type specifies a wireless node type to which the corresponding OTA like the PNC, the router, or the terminal node, the version number can include build date and time information or a value corresponding to a version of new firmware to be updated, the total size may represent a total size of new firmware, and the block size may represent the size of a block that the access point or the router sends at one time.

For reference, in FIG. 8, the beacon payload is illustrated as following a beacon frame header, but this order and specific payload contents and size are only illustrated as examples to aid understanding, and are not intended to limit this.

Figure 9:
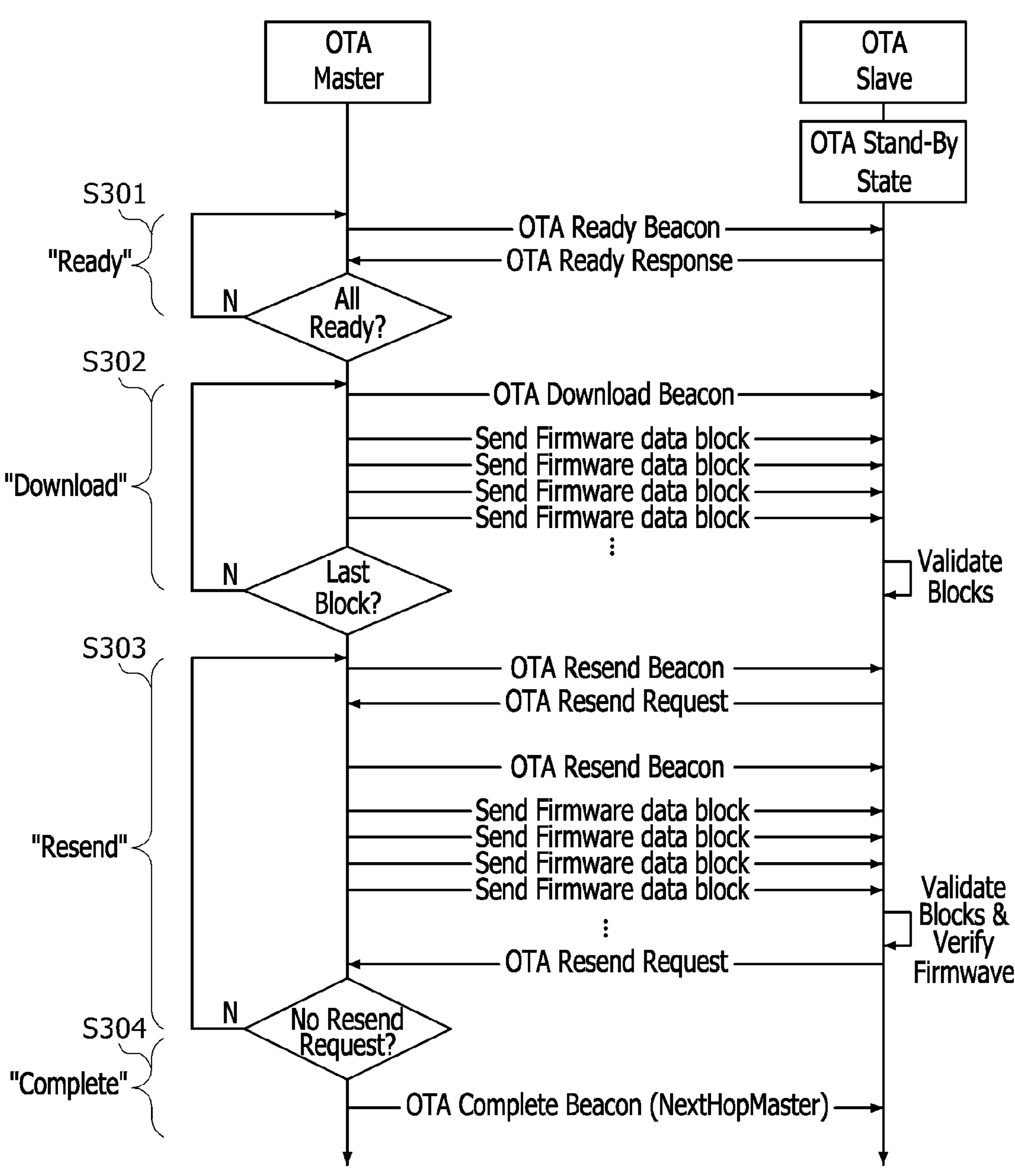
FIG. 9 is a flowchart for describing an operation of wireless firmware update between the OTA master and the OTA slave in FIG. 6 in more detail.

FIG. 9 is a flowchart for describing the operation of the wireless firmware update between the OTA master and the OTA slave in FIG. 6 in more detail.

Referring to FIG. 9, the OTA master performs the firmware download procedure for child nodes connected to the OTA master as follows.

In the ready operation (S301), the OTA master sends an OTA ready beacon frame to the child node, the OTA slave that receives the OTA ready beacon frame sends the OTA ready response to notify a ready state, and the OTA master that receives the OTA ready response determines that all the child nodes connected to the OTA master are ready to download the firmware.

In the download operation (S302), the OTA master sends an OTA download beacon frame to the OTA slave, downloads firmware data to the OTA slave in units of blocks using several GTS slots within the corresponding beacon interval, and repeats until the OTA master sends a last block, and the OTA slave validates the downloaded block.

In the resend operation (S303), the OTA master completes the firmware download and then sends an OTA resend beacon frame to the OTA slave, the OTA slave that receives the OTA resend beacon sends an OTA resend request to the OTA master for blocks that needs to be resent, the OTA master determines which block needs to be resent when the OTA master receives the OTA resend request to resend the firmware data to the OTA slave in units of blocks and download the firmware data, and the OTA master repeats until no more OTA resend requests are received.

When all the firmware blocks are downloaded through the download operation (S302) or the resend operation (S303), the OTA slave performs verification.

In the complete operation (S304), when the OTA master determines that all resends are completed, it is determined that the firmware download of all the child nodes is completed, and the OTA master sends an OTA complete beacon frame to the OTA slave to complete the firmware download process.

In this case, when one or more routers R are included in the child nodes, the parent OTA master selects these routers R one by one and includes the value (NextHopMaster value) corresponding to the address value of one of the routers in the OTA complete beacon frame, so the corresponding router operates as the OTA master and performs the firmware download procedure for the child nodes connected to the router.

When the OTA master of the corresponding child router completes the firmware download, the OTA master sends the OTA complete beacon frame, so the parent node receives the OTA complete beacon frame and the child router validates that the firmware download is completed.

This process is repeated until the firmware download of all the child routers is completed. To notify that there are no more routers performing download among the child nodes, a preset value such as 0xFFFF may be used as the address value (NextHopMaster value) of the OTA complete beacon.

Additional Description of Ready Operation (S301)

When the OTA master sends a beacon frame at every beacon slot, the OTA master adds the OTA payload to the beacon frame, but sets an OTA state value to ready, and sends the OTA data including the address values of all the child nodes, which send the OTA ready response, in a bitmap format. When the OTA slave receives the beacon frame, it is determined whether the beacon frame includes its own address value and, when it is determined that the beacon frame does not include its own address value, the OTA slave sends the OTA ready response frame to the OTA master.

For reference, the procedure of determining, by the OTA master that receives the OTA ready response, that all the child nodes (including the router) connected to the OTA master are ready to download the firmware is as illustrated in FIG. 10. However, it should be noted that FIG. 10 is schematically illustrated to aid understanding of description.

FIG. 10 is an exemplary diagram for describing the process of determining, by the OTA master, whether all the child nodes connected to the OTA master are ready to download the firmware in FIG. 6. The OTA master initializes a counter value and a timer value (S401), and waits to receive the OTA ready response frame until a timeout occurs (S402).

When the OTA ready response frame is received, the OTA master processes the corresponding OTA ready response frame, and initializes the counter value (S404), and checks whether all the child nodes send the OTA ready response frame (S405).

Meanwhile, when the OTA ready response frame is not received and times out, the OTA master checks whether the counter value becomes 0 (S403), and when the counter value does not become 0 (N in S403), the OTA master decreases the counter value by 1, initializes the timer value (S406), and then waits to receive the OTA ready response frame until the timeout occurs (S402).

In addition, if all the child nodes do not send the OTA ready response frame (N in S405), the OTA master waits to receive the OTA ready response frame until the timeout occurs (S402).

On the other hand, when all the child nodes send the OTA ready response frame (Y in S405) or when the counter value becomes 0 when the OTA ready response frame is not received and times out (Y in S403), it is determined that all the child nodes (including the router) are in a firmware download ready state (S407).

Additional Description of Download Operation (S302)

When the OTA master downloads the firmware data to the OTA slave, one or more GTS slots or CAP slots may be required, so the firmware to be downloaded may be divided into small blocks that can be sent within the slot and sent multiple times.

When the OTA master sends the beacon frame at every beacon slot, the OTA payload is added to the beacon frame, and the OTA state value is set to download.

The validation of the firmware block by the OTA slave may include, for example, a process of performing a cyclic redundancy check (CRC) for each received block and counting serial numbers included in information of each block to determine whether anything is missing.

Additional Description of Resend Operation (S303)

When the OTA master sends the beacon frame at every beacon slot, the OTA master adds the OTA payload to the beacon frame, but sets the OTA state value to resend, and sends the OTA data including serial number of the firmware data block requested by all the child nodes, which sends the OTA resend request, in the bitmap format.

When the OTA slave receives the frame (frame including the serial number of the firmware data block in the bitmap format requested by the child nodes), the OTA slave checks whether the frame includes the firmware data block that the OTA slave does not receive, and when there is a need to resend some firmware blocks that are not included, the OTA slave sends the OTA resend request frame.

The download and verification of all the firmware blocks by the OTA slave includes, for example, a process of verifying integrity and reliability of the received firmware.

The OTA master that receives the OTA resend request determines that it is necessary to resend one or more firmware blocks included in the OTA resend request.

For reference, the procedure of resending, by the OTA master, the firmware block or determining that the firmware download is completed is as illustrated in FIG. 11. However, it should be noted that FIG. 11 is schematically illustrated to aid understanding of the description.

FIG. 11 is an exemplary diagram for describing a process of resending, by the OTA master, the firmware block or determining that the firmware download is completed in FIG. 6. The OTA master initializes the counter value and the timer value (S501), and waits to receive the OTA ready response frame until the timeout occurs (S502).

When the OTA resend request frame is received, the OTA master processes the corresponding OTA resend request frame, and initializes the counter value (S503), and then waits to receive the OTA ready response frame until the timeout occurs (S502).

Meanwhile, when the OTA resend request frame is not received and times out, the OTA master checks whether the counter value becomes 0 (S504), and when the counter value does not become 0 (N in S504), the OTA master decreases the counter value by 1, initialize the timer value (S505), and then wait to receive the OTA resend request frame until the timeout occurs (S502).

When the counter value becomes 0 when the OTA resend request frame is not received and times out (Y in S504), the OTA master checks whether the number of received OTA resend request frames is greater than 0 (S506), and when the number of received OTA resend request frames is greater than 0 (Y in S506), the OTA master uses a list of firmware blocks included in the received OTA resend request frame until the timeout occurs to write a list of firmware resend blocks (S507), and uses the list of firmware resend blocks to resend the firmware blocks (S508).

Meanwhile, when the number of received OTA resend request frames is not greater than 0 (N in S506), it is determined that the firmware download of all the child nodes (including the router) is completed (S509).

Additional Description of Complete Operation (S304)

When the OTA master sends the beacon frame at every beacon slot, the OTA master adds the OTA payload to the beacon frame, and sets the OTA state value to complete.

Figure 12:
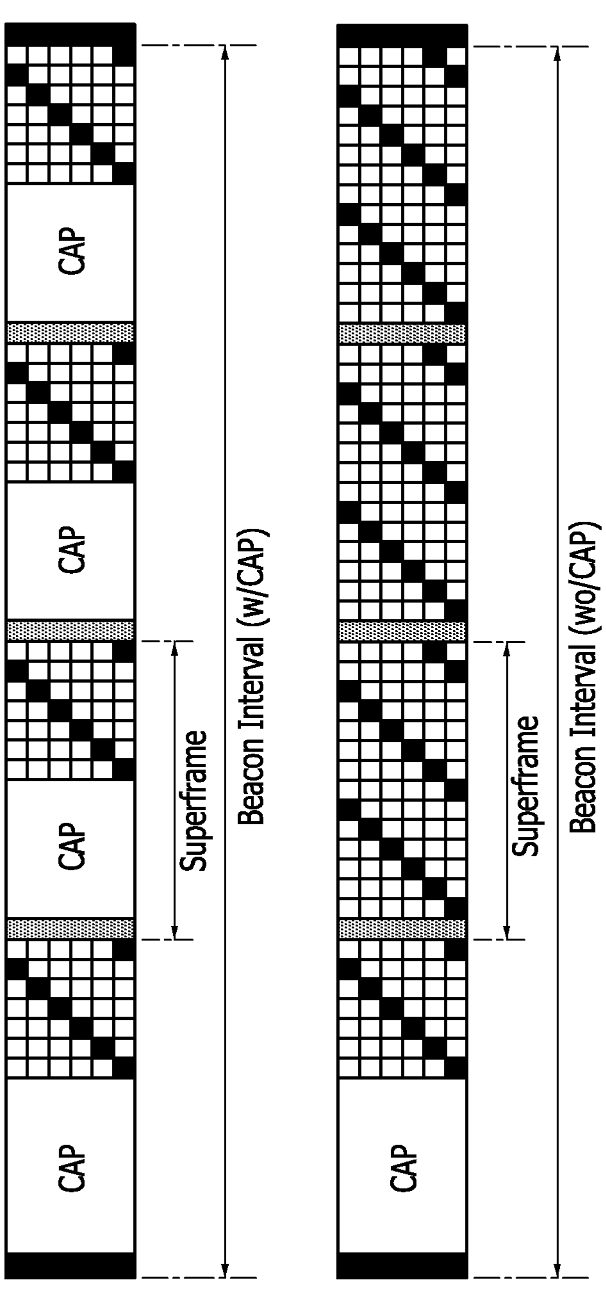
FIG. 12 is an exemplary diagram illustrating a shape of a slot occupied when the OTA master downloads firmware using consecutive guaranteed time slot (GTS) slots into a case (w/CAP) where there is contention access period (CAP) and a case (wo/CAP) where there is no CAP in FIG. 6.

FIG. 12 is an exemplary diagram illustrating a shape of a slot occupied when the OTA master downloads firmware using consecutive GTS slots into a case (w/CAP) where there is CAP and a case (wo/CAP) where there is no CAP in FIG. 6.

Since one wireless node may allocate one or more GTS slots within one superframe according to the IEEE 802.15.4e standard, in the present invention, in order to reduce the time required to download the firmware, all the GTS slots may be reallocated so that the OTA master may use the GTS slots to send firmware blocks.

Since the OTA master according to the present invention sends the firmware sequentially, it is possible for one OTA master to occupy all the GTS slots at one time.

The OTA slave only receives the firmware and does not send data, so it is possible for the OTA master to determine whether to reallocate the GTS slots.

The access point AP, which is the parent OTA master at the highest level, completes the firmware download of all of its own child nodes and receives an OTA complete beacon frame including a preset value such as 0xFFFF from all of its own child routers, and determines that the firmware download procedure for all the wireless nodes in the network is completed.

In this case, the access point starts the firmware update application process so that all the wireless nodes may apply new firmware.

To apply the firmware update, the OTA master sends the OTA finish beacon frame. The router relays the OTA finish beacon. The process (i.e., OTA finish beacon relay process) is repeated for a predetermined period of time to secure that all the wireless nodes may receive the OTA finish beacon frame.

The access point and the terminal node or router that receives the OTA finish beacon apply new firmware after a certain period of time.

Through this procedure, all the wireless nodes existing in the network record the firmware to their internal storage and reboot the firmware to apply the new firmware.

Figure 13:
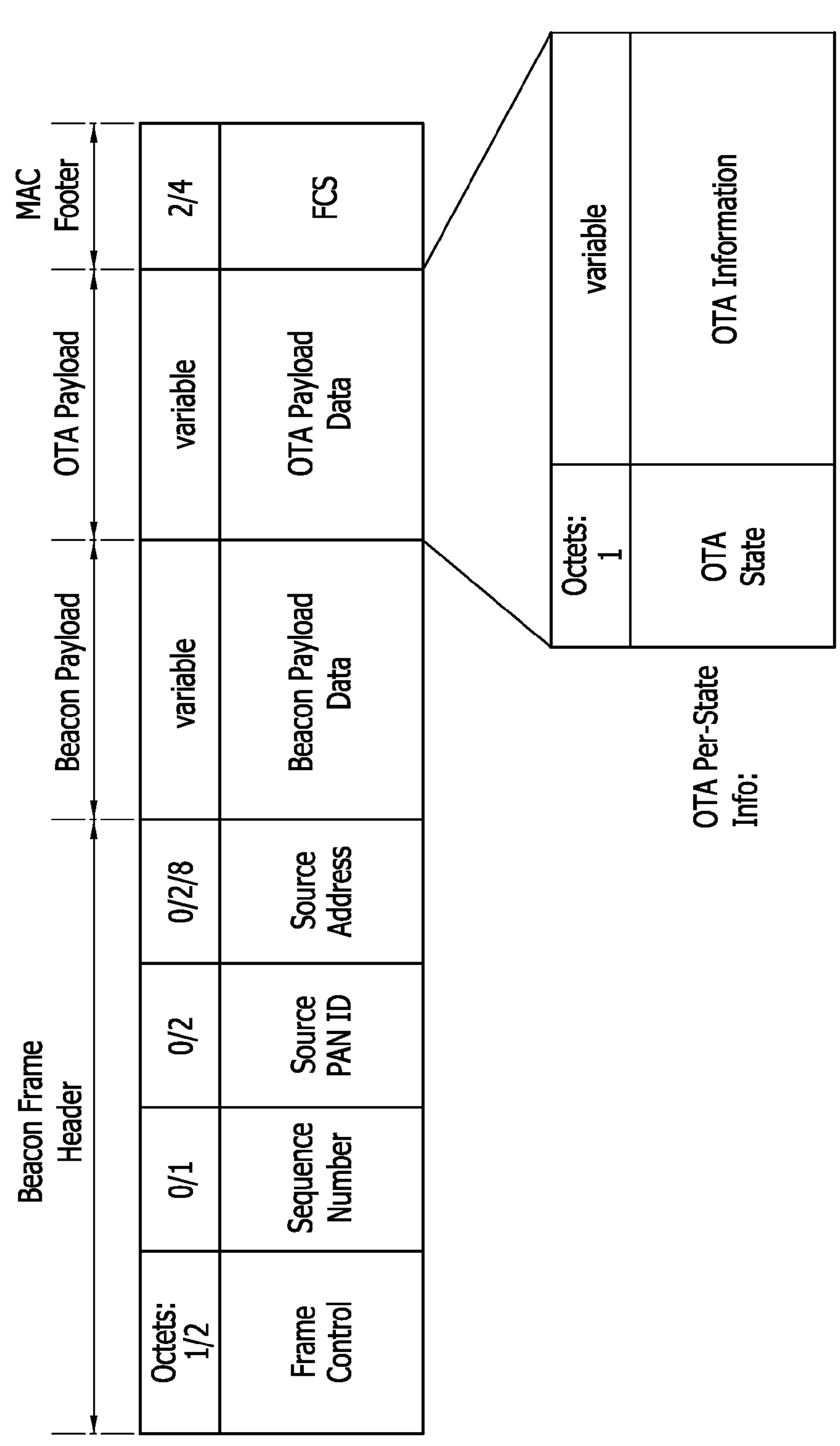
FIG. 13 is an exemplary diagram illustrating a beacon frame to which an OTA payload is added in order to wirelessly update the firmware in the multi hop-based IoT wireless network in FIG. 6.

FIG. 13 is an exemplary diagram illustrating the beacon frame to which the OTA payload is added in order to wirelessly update the firmware in the multi hop-based IoT wireless network in FIG. 6.

Referring to FIG. 13, the OTA per-state information includes an OTA state field and an OTA information field.

The OTA state field is a field indicating any one of the OTA ready beacon, the OTA download beacon, the OTA resend beacon, and the OTA complete beacon or OTA finish beacon.

The OTA information field is a field for recording additional information corresponding to the OTA state value.

In the case of the OTA ready beacon, it is possible to include the address values of all the child nodes, which send the OTA ready response, in the bitmap format. In the case of the OTA download beacon, it is possible to include the first and last index numbers of the firmware block to be sent within the beacon interval. In the case of the OTA resend beacon, it is possible to include a firmware block index number to be resent within the beacon interval. In the case of an OTA complete beacon, the address value of one of the routers is specified as the NextHopMaster value only when there are one or more routers among the child nodes. To notify that there are no more routers performing the download among the child nodes, the preset value such as 0xFFFF may be used as the address value (NextHopMaster value) of the OTA complete beacon.

In case of the OTA finish beacon, an OTA data item is not used.

For reference, in FIG. 13, the OTA payload is illustrated as following the existing beacon payload, but this order and specific payload contents and size are only illustrated as examples to aid understanding, and are not intended to limit this.

In addition, in the present embodiment described above, examples of using the OTA ready beacon, the OTA download beacon, the OTA resend beacon, and the OTA complete beacon or OTA finish beacon are illustrated, but it is also possible to use a larger number of OTA-related beacons to subdivide the procedure, or to use a smaller number of OTA-related beacons to simplify the procedure.

As described above, according to the present invention, it is possible to wirelessly update the firmware in the multi hop-based IoT wireless network, switch the mode of the wireless node (e.g., router and terminal node) from the normal mode for collecting the sensor data to the over the air (OTA) mode in order to wirelessly update the firmware in the multi hop-based IoT wireless network, wirelessly download the new firmware in the OTA mode, and apply the downloaded new firmware to the wireless node.

According to one aspect of the present invention, it is possible to wirelessly update firmware in the multi hop-based IoT wireless network.

According to another aspect of the present invention, it is possible to switch a mode of a wireless node (e.g., router and terminal node) from a normal mode for collecting sensor data to an over the air (OTA) mode for wireless firmware update in a multi hop-based IoT wireless network, wirelessly download new firmware in the OTA mode, and apply the downloaded new firmware to the wireless node.

Although the present invention has been described with reference to embodiments shown in the accompanying drawings, it is only an example. It will be understood by those skilled in the art that various modifications and equivalent other exemplary embodiments are possible from the present invention. Accordingly, a true technical scope of the present invention is to be determined by the spirit of the appended claims.

What is claimed is:

1. A method of updating firmware of a router and a terminal node in a multi hop-based Internet of things (IoT) wireless network system including an access point, a plurality of routers, and a plurality of terminal nodes, the access point, the router, and the terminal node each being configured to operate as an over-the-air (OTA) master when acting as a parent node, and as an OTA slave when acting as a child node, the method comprising:

a ready operation comprising transmitting, by the OTA master, an OTA ready beacon frame to the OTA slaves wirelessly connected to the OTA master and receiving, from the OTA slaves, OTA ready response frames indicating a ready state;

a downloading operation comprising transmitting, by the OTA master, firmware data to the OTA slave that is ready to download the firmware in units of blocks;

a resend operation comprising receiving, by the OTA master, from the OTA slave, an OTA resend request identifying one or more firmware data blocks that have not been successfully received by the OTA slave, and retransmitting the identified firmware data blocks to the OTA slave, wherein the resend operation is performed in response to the OTA resend request during or after the downloading operation; and a completion operation comprising transmitting, by the OTA master, an OTA complete beacon frame when no further OTA resend request is received, wherein, before the ready operation, the access point transmits a beacon frame indicating a normal mode to the router, and the router relays the beacon frame and sends the beacon frame to other routers and terminal nodes that constitute the wireless network, and sensor data collected by terminal nodes is transmitted to the access point via the routers during the normal mode.

2. The method of claim 1, wherein the OTA master determines that all child nodes are ready to download the firmware when OTA ready response frames are received from all OTA slaves wirelessly connected to the OTA master.

3. The method of claim 1, wherein the downloading operation further comprises transmitting an OTA download beacon frame to the OTA slave and transmitting the firmware data in units of blocks using a plurality of guaranteed time slots (GTSs) within a corresponding beacon interval.

4. The method of claim 3, wherein the OTA master repeatedly transmits the firmware data blocks until a last firmware data block is transmitted, and each OTA slave validates each received firmware data block.

5. The method of claim 1, wherein the resend operation further comprises transmitting, by the OTA master, an OTA resend beacon frame prior to receiving the OTA resend request.

6. The method of claim 1, wherein the OTA complete beacon frame is transmitted after the OTA master confirms that firmware download of all OTA slaves wirelessly connected thereto is completed.

7. The method of claim 1, wherein, when one or more routers are included among the OTA slaves, the OTA complete beacon frame includes an address value of a selected lower router to indicate that the selected lower router is to operate as a next OTA master.

8. The method of claim 7, wherein, after completing firmware download to its child nodes, the selected lower router transmits an OTA complete beacon frame to its parent OTA master.

9. The method of claim 7, wherein, when no further lower router remains to perform firmware download, a preset value is set in the address value of the OTA complete beacon frame.

10. The method of claim 1, wherein the access point includes a personal area network coordinator (PNC) function that is a lower wireless node management function, and supports generation and management of a network and interworking of a wired area and a wireless network service area, the router relays sensor data from the terminal node to the access point so that the sensor data is collected by the PNC, and relays and sends a beacon frame sent from the PNC, and the terminal node collects the sensor data, and transmits the collected sensor data to the access point via the router.

11. The method of claim 1, wherein, when the access point transmits the beacon frame, the access point transmits the beacon frame at designated beacon intervals, and the router allocates some of superframes and sends data using carrier sense multiple access-collision avoidance (CSMA-CA) during a contention access period (CAP) send period for communication with other wireless nodes so that the router relays and sends the beacon frame, and allocates a guaranteed time slots (GTSs) to each wireless node within a contention free period (CFP) send period to secure reliability of sending of time-sensitive sensor data while maintaining a superframe structure of IEEE 802.15.4.

12. The method of claim 1, wherein, after the completion operation, when it is determined that firmware download of all the child nodes is completed, the access point corresponding to the OTA master transmits an OTA finish beacon frame to notify the child nodes to apply new firmware, and the router is implemented to apply the new firmware by relaying corresponding contents to a lower wireless node and notifying the lower wireless node.

13. The method of claim 1, wherein, when updating the firmware starts, the access point transmits a beacon frame indicating a mode change from a normal mode to an OTA mode to the router and a lower wireless node, and a wireless node that receives a beacon frame indicating the mode change to the OTA mode switches to the OTA mode and waits in a stand-by state.

14. The method of claim 13, wherein the beacon frame is a beacon frame to which a beacon payload for updating the firmware is added, and the beacon payload includes OTA mode change information, and the OTA mode change information includes at least one of a target device type, a firmware version number, a total firmware size, and a block size.

15. The method of claim 14, wherein;

the target device type is a wireless node type to which the corresponding OTA is applied, including a personal area network coordinator (PNC), a router, or a terminal node, the firmware version number includes build date and time information or a value corresponding to a version of new firmware to be updated, the total firmware size indicates a total size of the new firmware, and the block size indicates a size of a block transmitted at one time by the access point or the router.

16. The method of claim 13, wherein the beacon frame is a beacon frame to which an OTA payload is added for updating the firmware, and the OTA payload is OTA per-state information and includes an OTA state field and an OTA information field.

17. The method of claim 16, wherein the OTA state field is a field indicating any one of an OTA ready beacon, an OTA download beacon, an OTA resend beacon, and an OTA complete beacon or OTA finish beacon, and the OTA information field is a field for recording additional information corresponding to an OTA state value.

18. The method of claim 1, wherein the OTA master allocates one or more guaranteed time slots (GTSs) within one superframe and reallocates all GTSs within the superframe to transmit the firmware data blocks consecutively to reduce firmware download time.

19. An apparatus for updating firmware of a router and a terminal node in a multi hop-based Internet of things (IoT) wireless network system including an access point, a plurality of routers, and a plurality of terminal nodes, the apparatus being configured to operate as a node in the wireless network system and comprising:

a processor; and a memory having instructions stored thereon, which, when executed by the processor, cause the processor to:

operate as an over-the-air (OTA) master when the apparatus acts as a parent node and operate as an OTA slave when the apparatus acts as a child node;

when operating as the OTA master, transmit an OTA ready beacon frame to OTA slaves wirelessly connected to the apparatus and receive, from the OTA slaves, OTA ready response frames indicating a ready state;

perform a downloading operation comprising transmitting firmware data to an OTA slave that is ready to download the firmware in units of blocks;

perform a resend operation comprising receiving, from the OTA slave, an OTA resend request identifying one or more firmware data blocks that have not been successfully received by the OTA slave, and retransmitting the identified firmware data blocks to the OTA slave in response to the OTA resend request, wherein the resend operation is performed during or after the downloading operation; and transmit an OTA complete beacon frame when no further OTA resend request is received, wherein, before a ready operation corresponding to the ready state, the access point transmits a beacon frame indicating a normal mode to the router, and the router relays the beacon frame and sends the beacon frame to other routers and terminal nodes that constitute the wireless network, and sensor data collected by terminal nodes is transmitted to the access point via the routers during the normal mode.

* * * * *